(12) United States Patent
Oaks

(10) Patent No.: US 11,649,022 B1
(45) Date of Patent: May 16, 2023

(54) PERSONAL FLOTATION APPARATUS

(71) Applicant: Henry Oaks, Chicago, IL (US)

(72) Inventor: Henry Oaks, Chicago, IL (US)

( * ) Notice: Subject to any disclaimer, the term of this patent is extended or adjusted under 35 U.S.C. 154(b) by 0 days.

(21) Appl. No.: 17/941,556

(22) Filed: Sep. 9, 2022

(51) Int. Cl.
| | |
|---|---|
| *B63C 9/093* | (2006.01) |
| *B32B 5/18* | (2006.01) |
| *B32B 3/18* | (2006.01) |
| *B32B 27/06* | (2006.01) |
| *B32B 7/09* | (2019.01) |
| *A41D 7/00* | (2006.01) |
| *B32B 27/36* | (2006.01) |
| *B32B 27/40* | (2006.01) |

(52) U.S. Cl.
CPC .............. *B63C 9/093* (2013.01); *A41D 7/001* (2013.01); *B32B 3/18* (2013.01); *B32B 5/18* (2013.01); *B32B 7/09* (2019.01); *B32B 27/065* (2013.01); *B32B 27/36* (2013.01); *B32B 27/40* (2013.01); *B32B 2250/40* (2013.01); *B32B 2266/0235* (2013.01); *B32B 2266/08* (2013.01); *B32B 2270/00* (2013.01); *B32B 2367/00* (2013.01); *B32B 2375/00* (2013.01); *B32B 2437/00* (2013.01)

(58) Field of Classification Search
CPC ......... B63C 9/087; B63C 9/093; B63C 9/115; B63C 9/135; A41D 7/001; B32B 3/18; B32B 3/20; B32B 5/18; B32B 5/32; B32B 7/09; B32B 27/065; B32B 27/36; B32B 27/40; B32B 2250/40; B32B 2266/0235; B32B 2266/08; B32B 2270/00; B32B 2367/00; B32B 2375/00; B32B 2437/00

See application file for complete search history.

(56) References Cited

U.S. PATENT DOCUMENTS

| | | | | | |
|---|---|---|---|---|---|
| 1,301,831 | A | * | 4/1919 | Gain ....................... | B63C 9/115 441/115 |
| 3,404,406 | A | * | 10/1968 | Balliet .................... | B63C 11/02 2/2.16 |
| 4,181,993 | A | * | 1/1980 | McDaniel ............... | B63C 11/04 441/108 |
| 5,823,838 | A | * | 10/1998 | Darcy ..................... | B63C 9/115 441/106 |
| 6,235,661 | B1 | * | 5/2001 | Khanamirian ........... | B32B 5/26 428/218 |

FOREIGN PATENT DOCUMENTS

| | | | | | |
|---|---|---|---|---|---|
| GB | | 127390 A | * | 5/1919 | ............. | B63C 9/115 |
| GB | | 910562 A | * | 11/1962 | | |
| WO | WO-2010013918 A2 | * | 2/2010 | ......... | A41D 13/0125 |

* cited by examiner

*Primary Examiner* — Ajay Vasudeva
(74) *Attorney, Agent, or Firm* — Fraline J. Allgaier

(57) ABSTRACT

An improved personal flotation apparatus is presented. The personal flotation apparatus is a form-fitting body swimsuit garment having a plurality of uniformly sized and uniformly spaced cells configured to receive uniformly sized flotation material to enable a wearer to float while wearing the device.

8 Claims, 3 Drawing Sheets

PERSONAL FLOTATION APPARATUS

FIELD OF THE INVENTION

The present invention refers to flotation devices and more particularly to an improved personal flotation apparatus, which in its preferred embodiment is a form-fitting body swimsuit garment comprising a plurality of uniformly sized and uniformly spaced cells.

BACKGROUND OF THE INVENTION

Flotation devices are designed to provide buoyancy to a user. When the user is in water, the flotation device provides an upward force to support the weight of the user. These devices can include various types of life jackets, throwables, inflatable packs, or buoyancy aids.

In the typical operation of a flotation device, a user first selects an appropriate size, loosens the straps on all sides of the device, avoids the overlapping of portions of the device, and adjusts the device to a non-slip configuration around the shoulders and chest.

Flotation devices of conventional construction make no provision for comfort or long-term use in the water. The most commonly used designs are class II PFDs, also known as near-shore buoyant vests that feature slip-on buckles that are reinforced from the bottom of the vest. Some flotation devices are provided with a plurality of ties, buckles, and protruding support structures. These can be bulky, uncomfortable for long-term use in the water, provide poor core insulation, block the peripheral vision of a user, and difficult to use while swimming. These devices create imbalance during use, high buoyancy concerns, and present additional challenges for a user to swim in a horizontal fashion or to attempt deeper submersion into the water.

In many situations, as for example in swimming or coordinated activities in the water, movement can be restricted. Therefore, it is an object of the present invention to provide a personal flotation apparatus comprising a form-fitting body swimsuit garment. The swimsuit garment further having a plurality of uniformly sized and uniformly spaced cells where each cell is configured to receive uniformly sized flotation material.

To this end, the novel and distinctive features of the disclosure consist of a swimsuit garment wherein the cells are arranged to create horizontal and vertical channels across the swimsuit garment. The personal flotation apparatus of the present disclosure is further characterized with the following novel features: (1) The swimsuit garment consists of an interior surface and an exterior surface and wherein the cells and channels are disposed on the entirety of the exterior surface; and (2) The swimsuit garment is comprised of an inner layer of material forming the interior surface and an outer layer of material forming the exterior surface and wherein the cells are formed by fastening the outer layer of material to the inner layer of material.

SUMMARY

This disclosure is an improved personal flotation apparatus comprising a form-fitting body swimsuit garment. In an embodiment, the personal flotation apparatus further comprises a plurality of uniformly sized and uniformly spaced cells where each cell is configured to receive uniformly sized flotation material and wherein the cells are arranged to create horizontal and vertical channels across the swimsuit garment. Interior surfaces and exterior surfaces are further provided and wherein the cells and channels are disposed on the entirety of the exterior surface. The personal flotation apparatus further comprises an inner layer of material forming the interior surface and an outer layer of material forming the exterior surface and wherein fastening the outer layer to the inner layer forms the cells. The outer layer is stitched to the inner layer to create the uniform cells on the exterior surface and the uniform cells are thereby created on the exterior surface.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

Additional advantages and features of the present invention will become more apparent when considered in light of the following specification and drawings.

BRIEF DESCRIPTION OF THE DRAWINGS

The present embodiments are illustrated by way of the figures of the accompanying drawings, which may not necessarily be to scale, in which like references indicate similar elements, and in which.

DETAILED DESCRIPTION

Figure 1:
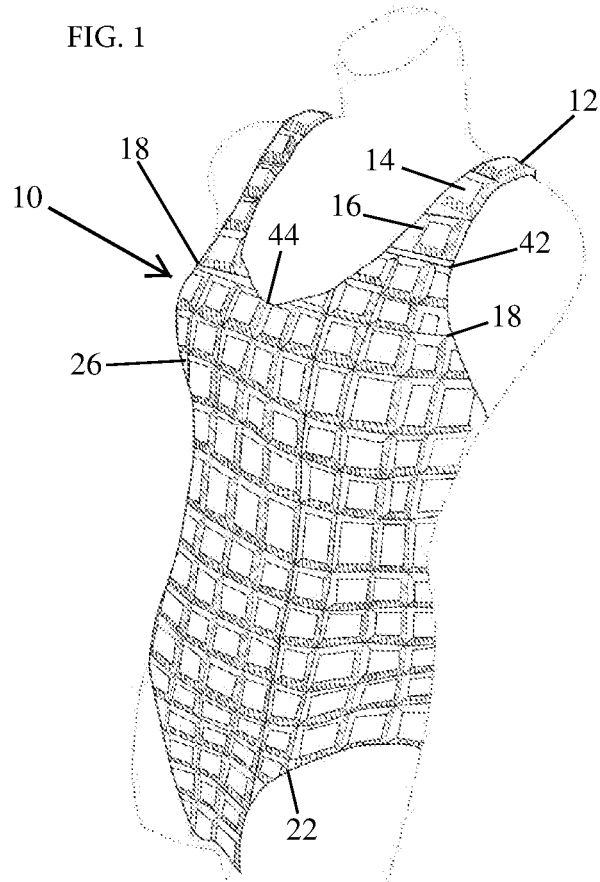
FIG. 1 is a left side perspective view of an improved personal flotation apparatus described herein.

The following detailed description is a contemplated mode of carrying out a personal flotation apparatus 10 and method of manufacture described herein. Although the personal flotation apparatus 10 and method of manufacture are explained in relation to an illustrated embodiment, it is understood that many possible modifications and variations can be made without departing from the spirit and scope of the disclosure.

Therefore, the personal flotation apparatus 10 may be used in various types of settings. The personal flotation apparatus 10 contemplated by the disclosure is therefore also adapted to be used as a recreational device that can be used by young children who may be supported safely while swimming, diving, or the like; and to a significant extent the identical construction, made in various sizes, the apparatus can be utilized by adults for leisure use in larger bodies of water, swimming pools, resorts, or as an apparatus that aids in hospice care, physical therapy, assisted living, nursing homes, or the like for suspending the patient in water. It is desired that the personal flotation apparatus 10 include flexibility in design, easy modifications in structure, convenience in use, and efficiency in manufacturing.

It can be appreciated that implementation of a personal flotation apparatus 10 and method of manufacture can include interior and exterior material capable of cell formation and capable of arranging the flotation material 16 in rows and columns. Low-density material, such as a closed cell polyvinylchloride ("PVC") foam or closed cell polymer foam, can be used as the flotation material and constructed in at least ¼ inch sizes with each having a circumference of ½ by ½ inches. It is anticipated that the size of the flotation material 16 may vary according to the style of the garment and the needs of a particular user. Preferably, the personal flotation apparatus 10 may be formed of rigid, distortable, shape-resuming, and durable material of the type provided above. The selected block of material and thickness would depend on the desired floating capacity or the desired buoyancy for each personal flotation apparatus 10.

The flotation material 16 must be designed to withstand expansion from water pressure and to withstand the same to provide the flotation effect on the exterior surface 26 thereof. The interior surface 24, exterior surface 26, inner layer of material 28, and outer layer of material 32 for the swimsuit garment 12 can be constructed from a stretchable material so as to allow the flotation material 16 to straighten and conform to the torso of the wearer while the wearer engages in physical activities in the water. The material can include spandex, polyester, polyester blends, stretchable garment material with a high coefficient of elasticity, high tech materials for constructing aquatic gear, or the like to enclose the flotation material 16.

The inventor is suggesting the multi-purpose sprayer because it would fulfill the need for a personal flotation apparatus 10 with a plurality of spaced cells 14 of flotation material 16. The appealing features of the personal flotation apparatus 10 would be its functionality and the safety provided for the wearer. The overall size, all parts, shapes, configuration, material composition, dimensions, and indicia applications would be developed during the design and engineering phases, prior to manufacture.

The potential exists for varying the production of the personal flotation apparatus 10 in ways, which could make it more appealing to a wider range of end users. This could include producing the personal flotation apparatus 10 in various styles and with various types of material.

Figure 2:
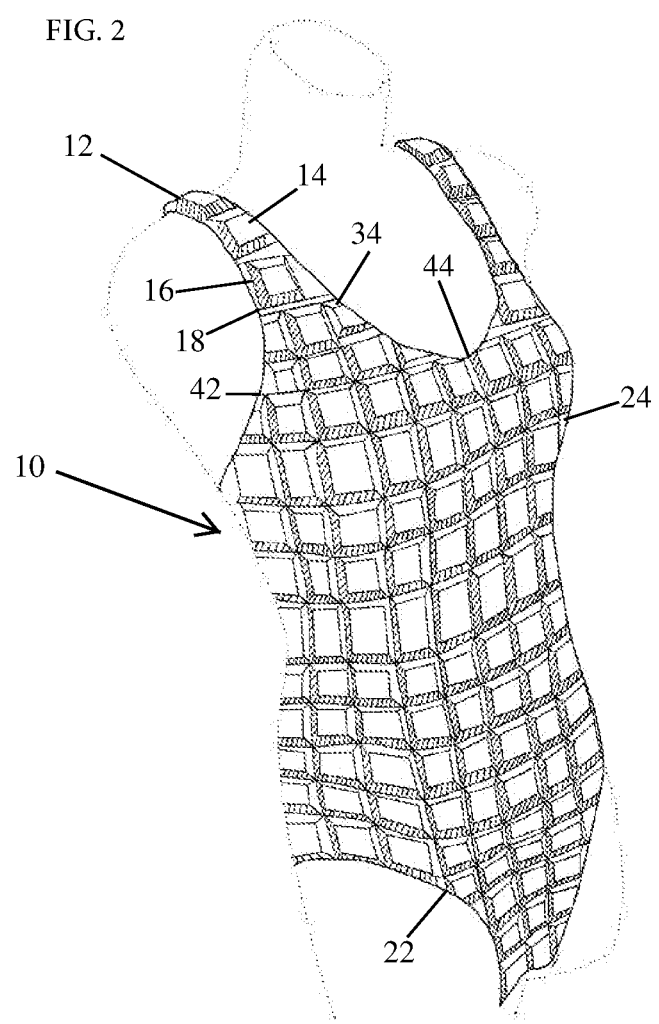
FIG. 2 is a right side perspective view thereof.
Figure 3:
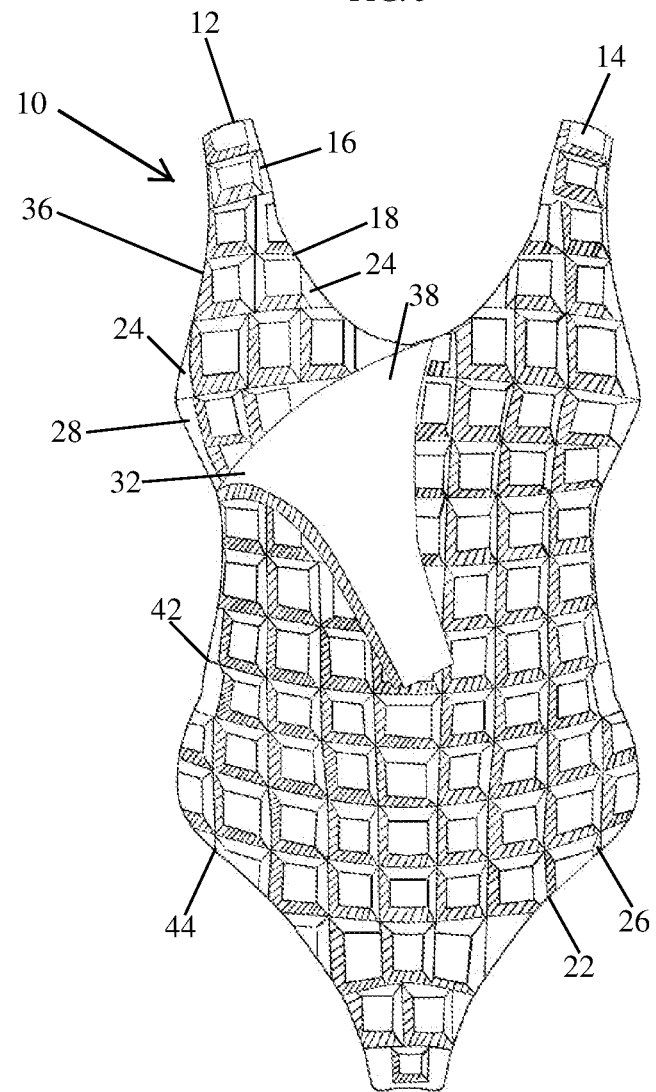
FIG. 3 is a cross-sectional view of the improved personal flotation apparatus according to an embodiment described herein.

For example, and without limitation, FIGS. 1-3 show the personal flotation apparatus 10 according to one embodiment of the present disclosure wherein the personal flotation apparatus 10 comprises a form-fitting body swimsuit garment 12. The swimsuit garment 12 further comprising a plurality of uniformly sized and uniformly spaced cells 14 wherein each cell 14 is configured to receive uniformly sized flotation material 16 and wherein the cells 14 are arranged to create horizontal channels 18 and vertical channels 22 across the swimsuit garment 12.

The swimsuit garment 12 consists of an interior surface 24 and an exterior surface 26, and wherein the cells 14 and channels 16, 18 are disposed on the entirety of the exterior surface 26. The swim garment is comprised of an inner layer of material 28 forming the interior surface 24 and an outer layer of material 32 forming the exterior surface 26 and wherein fastening the outer layer of material 28 to the inner layer of material 32 forms the cells 14. Wherein the flotation material 16 of the personal flotation apparatus 10 is a buoyant material and the uniform cells 14 are created on the exterior surface 26 by stitching the outer layer of material 32 to the inner layer of material 28 and the uniform cells 14 are raised on the exterior surface 26 and are arranged in rows and columns. Stitching forms the horizontal channels 18 and vertical channels 22 and the interior surface 24 of the swimsuit garment 12 is a smooth non-raised surface.

The personal flotation apparatus 10 is constructed by cutting flotation material 16 into uniformly sized segments 34 and cutting the material to form an inner layer panel 36 and an outer layer panel 38 of a swimsuit garment 12. The uniformly sized segments 34 of flotation material are arranged in equally spaced rows and columns on the surface of the inner layer panel 36 and the surface of the inner layer panel 36 containing the uniformly sized segments 34 of flotation material 16 is covered with the outer layer panel 38. The outer layer panel 38 is stitched to the inner layer panel 36 using a series of horizontal stitches 42 between the rows of flotation material segments 34. The horizontal and vertical stitches 42, 44 form a series of uniformly sized and uniformly spaced cells 14 each containing a uniformly sized segment of flotation material 16 and wherein the cells 14 are arranged to create horizontals 18 and vertical channels 22 across the swimsuit garment 12.

The uniformly spaced cells 14 containing the flotation material 16 are means for raising and holding the wearer in a floating position. The spaced cells 14 are uniformly spaced so as to maintain a maximum of flexibility for the wearer and at the same time provide a maximum amount of flotation consistency throughout the exterior surface 26 of the personal flotation apparatus 10. Although there are horizontal channels 18 and vertical channels 22 in locations that are edgewise of the plurality of spaced cells 14, there is ample flotation provided from the cells 14. The entire interior surface 24 of the personal flotation apparatus 10 is in contact with the wearer's torso when the device is in use. This includes curved areas of the torso and the main parts of the body including the chest, abdomen, pelvis, and back.

The personal flotation apparatus 10 is designed to worn in an aquatic environment. Additional exterior clothing is not required. The personal flotation apparatus 10 and method of manufacture described herein is applicable to various swimsuit designs, bathing suits, swimming trunks, bathers, or the like for males or females of various age groups and physical abilities. In use, a wearer slides the entire torso into the personal flotation apparatus 10. The flexible interior and exterior surfaces 24, 26 allow for the adjustment of the device and the positioning of the plurality of spaced cells 14. The wearer may then resume any swimming, flotation, or desired aquatic activity. The personal flotation apparatus 10 will provide the wearer with a balanced body position on the surface of the water.

Having described my invention, however, many modifications thereto will become apparent to those skilled in the art to which it pertains without deviation from the spirit of the invention as defined by the scope of the appended claims. Although the invention has been explained in relation to its preferred embodiment, it is to be understood that many other possible modifications and variations can be made without departing from the spirit and scope of the invention.

What is claimed is:

1. A personal flotation apparatus comprising a form-fitting swimsuit garment, said swimsuit garment comprising:

an inner layer panel and an outer layer panel, each panel comprising a flexible material and having an inside surface and an outside surface, wherein the inside surface of the inner layer panel defines an interior surface of the swimsuit garment and the outside surface of the outer layer panel defines an exterior surface of the swimsuit garment; and a plurality of uniformly sized segments of flotation material;

wherein the inner layer panel is joined to the outer layer panel with a series of horizontal and vertical stitches to form a plurality of uniformly sized and uniformly spaced cells therebetween, the cells being arranged in a plurality of rows and columns, each cell receiving a uniformly sized segment of the flotation material, the cells being arranged to define horizontal and vertical channels across the swimsuit garment, wherein the interior surface of the swimsuit garment is a smooth non-raised surface, and wherein the cells protrude on the exterior surface so that the channels defined by the cells are disposed entirely on the exterior surface of the swimsuit garment.

2. The personal flotation apparatus set forth in claim 1, wherein the flotation material comprises closed-cell foam.

3. The personal flotation apparatus set forth in claim 1, wherein the flexible material comprises stretchable material.

4. The personal flotation apparatus set forth in claim 1, wherein the stretchable material comprises at least one of spandex, polyester and polyester blend.

5. A method of construction fora personal flotation apparatus comprising a swimsuit garment, said method comprising the steps of:

cutting a flexible material to form an inner layer panel and an outer layer panel of the swimsuit garment, each panel having an inside surface and an outside surface, the inside surface of the inner layer panel defining an interior surface of the swimsuit garment and the outside surface of the outer layer panel defining an exterior surface of the swimsuit garment;

cutting a flotation material into a plurality of uniformly sized segments;

arranging the uniformly sized segments of the flotation material in equally spaced rows and columns on the outside surface of the inner layer panel;

covering the outside surface of the inner layer panel containing the uniformly sized segments of the flotation material with the outer layer panel;

stitching the outer layer panel to the inner layer panel using a series of horizontal stitches between the rows of the flotation material segments and a series of vertical stitches between the columns of the flotation material segments, the horizontal and vertical stitches forming a series of uniformly sized and uniformly spaced cells each containing a uniformly sized segment of the flotation material, the cells being arranged to define horizontal and vertical channels across the swimsuit garment;

wherein the interior surface of the swimsuit garment is a smooth non-raised surface, and wherein the cells protrude outwardly so that the channels defined by the cells are disposed entirely on the exterior surface of the swimsuit garment.

6. The method set forth in claim 5, wherein the flotation material comprises closed-cell foam.

7. The method set forth in claim 5, wherein the flexible material comprises stretchable material.

8. The method set forth in claim 7, wherein the stretchable material comprises at least one of spandex, polyester and polyester blend.

* * * * *